United States Patent
Bati et al.

(10) Patent No.: US 10,827,037 B2
(45) Date of Patent: Nov. 3, 2020

(54) SERVER TO SERVER INTERACTION IN CONTENT ITEM SELECTION EVENTS

(71) Applicant: Microsoft Technology Licensing, LLC, Redmond, WA (US)

(72) Inventors: Hardik Bati, Santa Clara, CA (US); Xiang Yu, Sunnyvale, CA (US); Haiyan Luo, San Jose, CA (US); Swetha Karthik, Sunnyvale, CA (US); John Moore, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 15/721,806

(22) Filed: Sep. 30, 2017

(65) Prior Publication Data
US 2019/0104201 A1    Apr. 4, 2019

(51) Int. Cl.
| | | |
|---|---|---|
| *H04L 29/06* | (2006.01) | |
| *H04L 29/08* | (2006.01) | |
| *H04L 29/12* | (2006.01) | |
| *G06F 16/9535* | (2019.01) | |
| *G06F 16/9537* | (2019.01) | |

(52) U.S. Cl.
CPC .......... *H04L 67/42* (2013.01); *H04L 61/251* (2013.01); *H04L 61/609* (2013.01); *H04L 65/1069* (2013.01); *H04L 65/4084* (2013.01); *H04L 65/80* (2013.01); *H04L 67/02* (2013.01); *H04L 67/26* (2013.01); *H04L 67/306* (2013.01); *G06F 16/9535* (2019.01); *G06F 16/9537* (2019.01); *H04L 61/2007* (2013.01)

(58) Field of Classification Search
CPC ..... H04L 67/42; H04L 61/609; H04L 61/251; G06F 16/9535; G06F 16/9537
USPC ........................................................ 709/203
See application file for complete search history.

(56) References Cited

U.S. PATENT DOCUMENTS

| | | | | |
|---|---|---|---|---|
| 7,818,402 B1 * | 10/2010 | Zhang | ................. | H04L 61/1582 709/219 |
| 2003/0110130 A1 * | 6/2003 | Pelletier | ................. | G06Q 30/02 705/50 |
| 2004/0054802 A1 * | 3/2004 | Beauchamp | ............ | H04L 51/04 709/238 |
| 2005/0021862 A1 * | 1/2005 | Schroeder | .............. | G06Q 30/02 709/246 |

(Continued)

*Primary Examiner* — Meng Vang
(74) *Attorney, Agent, or Firm* — Hickman Palermo Becker Bingham LLP; Daniel D. Ledesma

(57) ABSTRACT

Techniques are provided for server-to-server interaction for content item selection. A system receives a request for one or more content items from a client device. In response to receiving the request, the system generates multiple content requests. Each content request is sent to a different content provider of multiple content providers. At least one of the content requests is transmitted over a network to a content provider that is remote relative to the system. The system receives multiple responses, each of which is from a different content provider of the multiple content providers. Each response identifies a different content item. The system makes a determination that at least one content item is associated with a particular web domain. The system selects, based on the determination, a particular content item of the plurality of content items and causes the particular content item to be transmitted to the client device.

20 Claims, 5 Drawing Sheets

(56) References Cited

U.S. PATENT DOCUMENTS

| | | | |
|---|---|---|---|
| 2010/0041419 A1* | 2/2010 | Svendsen | H04L 67/22 |
| | | | 455/456.3 |
| 2011/0022492 A1* | 1/2011 | Karaoguz | H04L 65/4084 |
| | | | 705/26.4 |
| 2013/0346485 A1* | 12/2013 | Kembel | G06F 3/0484 |
| | | | 709/203 |
| 2014/0157298 A1* | 6/2014 | Murphy | H04N 21/64322 |
| | | | 725/14 |
| 2017/0032412 A1* | 2/2017 | Scharber | G06F 16/24573 |

* cited by examiner

SERVER TO SERVER INTERACTION IN CONTENT ITEM SELECTION EVENTS

TECHNICAL FIELD

The present invention relates generally to transmission of content items over computer networks and, more particularly, to altering the interaction between clients and servers when conducting content item selection events. SUGGESTED CLASSIFICATION: 709/203; SUGGESTED ART UNIT: 2447

BACKGROUND

The Internet allows end-users operating computing devices to request content from many different publishers. Some publishers desire to send additional content items to users who visit their respective websites or who otherwise interact with the publishers. To do so, publishers rely on external content delivery services that deliver the additional content items over one or more computer networks to computing devices of such users. In one approach, a client device executes code in a web page retrieved from a server, where execution of the code causes the client device to transmit a content item request to a separate content delivery service, which may respond with a content item. If no response is received, then the client device transmits a content item request to another content delivery service, and so forth, until the client device receives a response. A disadvantage of this approach is increased page latency, which harms user experience.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for implementing server to server interaction in a content item selection environment are provided. Instead of relying on a client device to interact directly with a content provider after requesting content from a publisher system, the publisher system interacts with the content provider to determine which additional content items will be presented through the client device concurrently with the requested content. Such an approach improves content item selection by significantly reducing latency of providing additional content items to the client device, particularly if the publisher system sends multiple calls in parallel to multiple content providers and performs a content item selection event based on any responses. Such a content item selection event, if implemented, improves overall yield for the publisher.

System Overview

Figure 1:
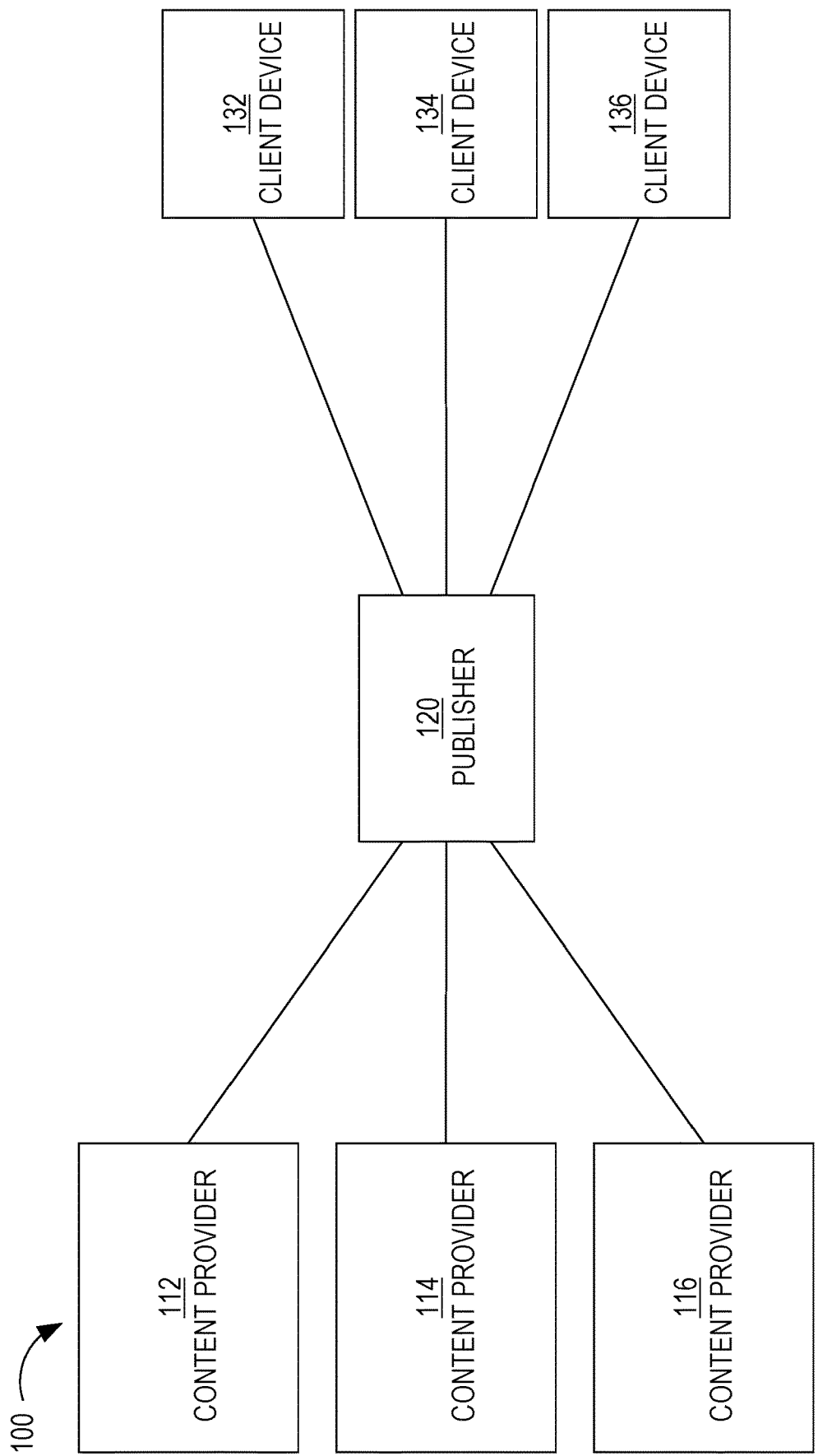
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a publisher system 120, and client devices 132-136. Although three content providers are depicted, system 100 may include more or less content providers. Similarly, system 100 may include more than one publisher and more or less client devices.

Content providers 112-116 interact with publisher system 120 (e.g., over a network, such as a LAN, WAN, or the Internet) to enable content items to be presented to end-users operating client devices 132-136. Thus, content providers 112-116 provide content items to publisher system 120, which in turn selects content items for presentation to users of client devices 132-136.

Examples of content providers 112-116 include internal providers and external providers. An internal provider is one that is operated by the same entity that operates publisher system 120. An internal provider may operate in the same data center and may rely on the same computing resources as publisher system 120. Examples of external providers include DoubleClick and AppNexus, which are online ad network that contract with multiple advertisers to provide content items (e.g., advertisements) to end users, either through publishers directly or indirectly through an intermediate content delivery exchange.

Both types of content providers receive requests for content and respond with a content item (e.g., an advertisement) to present to an end-user. Both types of content providers may each individually conduct a content item selection event (or "auction") in response to publisher system 120 receiving a single request from a client device. Thus, each type of content provider acts a content delivery exchange, allows third party entities to establish content delivery campaigns, and conducts auctions on behalf of the third party entities.

An example of a third party entity includes an advertiser. An advertiser of a product or service may be the same party as the party that makes or provides the product or service. Alternatively, an advertiser may contract with a producer or service provider to market or advertise a product or service provided by the producer/service provider.

Although depicted in a single element, publisher system 120 may comprise multiple computing elements and devices, connected in a local network or distributed regionally or globally across many networks, such as the Internet. Thus, publisher system 120 may comprise multiple computing elements, including file servers and database systems.

Publisher system 120 provides its own content to client devices 132-136 in response to requests initiated by users of client devices 132-136. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 120 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher system 120 provides the requested content (e.g., a web page) to the client device.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 132-136 include desktop computers, laptop computers, tablet computers, wearable devices, video game consoles, and smartphones.

Content Delivery Campaigns

A third party entity (or "campaign creator") establishes a content delivery campaign with a content provider (whether internal or external). A content delivery campaign includes (or is associated with) one or more content items. Thus, the same content item may be presented to users of client devices 132-136. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, geographic information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If a content provider receives, from a computing device, a request that does not satisfy the targeting criteria, then the content provider ensures that any content items associated with the particular content delivery campaign are not sent to the computing device.

Thus, a content provider is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. A content provider may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 120 may not satisfy targeting criteria of one content item of a campaign, the same content request may satisfy targeting criteria of another content item of the campaign.

Different content delivery campaigns that a content provider manages may have different charge models. For example, a content provider may charge a campaign creator of one content delivery campaign for each presentation of a content item from the content delivery campaign (referred to herein as cost per impression or CPM). A content provider may charge a campaign creator of another content delivery campaign for each time a user interacts with a content item from the content delivery campaign, such as selecting or clicking on the content item (referred to herein as cost per click or CPC). A content provider may charge a campaign creator of another content delivery campaign for each time a user performs a particular action, such as purchasing a product or service, downloading a software application, or filling out a form (referred to herein as cost per action or CPA). A content provider may manage only campaigns that are of the same type of charging model or may manage campaigns that are of any combination of the three types of charging models.

A content delivery campaign may be associated with a resource budget that indicates how much the corresponding campaign creator is willing to be charged by a content provider, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items are considered and a subset selected for presentation on a computing device in response to a request. Thus, each content request that a content provider receives triggers a content item selection event.

For example, in response to receiving a content request, content provider 112 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content provider 112 receives a content request that is initiated by the user. For example, when a content delivery campaign is created based on input from a campaign creator, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content provider 112) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, a content provider conducts one or more content item selection events. Thus, the content provider has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

Tracking User Interactions

In an embodiment, a content provider tracks one or more types of user interactions across client devices 132-136 (and other client devices not depicted). For example, content provider 112 determines whether a content item that content provider 112 delivers is presented at (e.g., displayed by or played back at) a client device. Such a "user interaction" is referred to as an "impression." As another example, content provider 112 determines whether a content item that content provider 112 delivers is selected by a user of a client device. Such a "user interaction" is referred to as a "click." Content provider 112 stores such data as user interaction data, such as an impression data set and/or a click data set.

For example, content provider 112 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content provider 112 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the client data item.

Dynamic Content Items

A "dynamic content item" is a content item that is generated dynamically from user data and/or contextual data. User data (also referred to herein as entity data) may include data from a user's online profile, data describing online activity that the user (or "viewer" or "viewing entity") has initiated or performed (e.g., searches, web sites visited, and online articles commented, liked, or shared), and/or the user's social data (e.g., the connections of the user, companies the user is following). Contextual data may include data about the page (or content) and the content/ad slot that a viewer requested and through which the content item will be presented (e.g., displayed or played).

For example, when a LinkedIn member views another Linkedin member's profile, who works for Company X, the viewer can be served (or presented with) a dynamic content item, which may include the text "Picture Yourself at Company X" or text "Work with us at Company X", along with a logo of Company X, a profile picture of the viewer, a name of the viewer, a list of one or more job titles of job openings (matching the viewer) at Company X, and a location of each job opening.

A content delivery campaign from which one or more dynamic content items originate is referred to herein as a "dynamic campaign." A dynamic campaign can be created with one or more types of content items and, for each type of content item, one or more formats. Different types of content items support (or are associated with) a different format group of a set of format groups. Such, for content item type A, there is a group of two formats; while for content item type B, there is a group of four formats. Also, the same dynamic campaign may be associated with multiple content items of the same type.

Examples of content item types that a single dynamic campaign may have include "JobsYouMayBeInterestedIn," "PictureYourself," "FollowCompany," and "Spotlight." Different content item types may be restricted to being displayed on certain web pages. For example, a "PictureYourself" content item, a "JobsYouMayBeInterestedIn" content item, and a "FollowCompany" content item can be displayed on an organization's (e.g., a company's) profile page while a "Spotlight" content item cannot. As another example, only "PictureYourself" and "FollowCompany" content items can be displayed on member profile pages while and "Spotlight" content items can only be displayed on search pages.

A format indicates a "look and feel" of a rendered content item. Different formats may specify that certain types of data items should be presented in a certain way. For example, one format may specify that a job title appears to the right of a person's profile picture while another format may specify that a job title appears immediately above the person's profile picture. Different formats may also specify which types of data items will be displayed at all. For example, one format may specify that a certain background image is to be included, whereas another format may specify that a different background image (or no background image) should be included.

Embodiments described herein are not limited to dynamic content items. Other example types and sources of content items are possible, including "text content items" and "display content items." A text content item is a content item whose content is fixed or static, regardless of the viewer that is viewing the content item. Attributes of the viewer and/or the viewed context may be used in selecting a text content item to display to the viewer, but the content of the content item does not change from viewer to viewer or from context to context. However, like a dynamic content item, a text content item may originate from a content delivery campaign that is managed by an internal content provider (e.g., content delivery exchange 120). A display content item, on the other hand, is a content item that originates from a third-party content provider or bidder, which is remote (or "external") relative to content delivery exchange 120.

Client-Side Content Provider Interaction

In one approach to providing content items (i.e., in addition to requested content, or content that the end-user is seeking), code within requested content is executed by a client device (e.g., client device 132) to make a call (e.g., an HTTP request) from the client device to a content provider. Thus, the client device interacts directly with the content provider. This is referred to herein as client-side content provider interaction.

In one variation of this approach, if a content provider does not have one or more content items or a certain amount of time elapses before receiving any content items from the content provider, then the client device might send a subsequent to another content provider. The client device may repeat this process for each content provider in a so-called "waterfall approach."

Server-Side Content Provider Interaction

In a different approach, according to an embodiment, publisher system 120 interacts with one or more content providers 112-116 on behalf of a client device and sends any received content items to the client device. This is referred to herein as "server-side bidding." The client device (that requested the original content from publisher system 120) may initiate the process by sending a request to publisher system 120 (over a network, such as a LAN, WAN, or the Internet). For example, a web page that the client device renders includes one or more calls (or HTTP requests) to publisher system 120 for one or more content items. In response, publisher system 120 provides (over a network, such as a LAN, WAN, or the Internet) one or more particular content items to the client device directly. In this way, the one or more particular content items may be presented (e.g., displayed) concurrently with the content requested by the client device from publisher system 120.

Alternatively, without waiting for an explicit request from the client device, publisher system 120 may send a content item request to one or more content providers 112-116.

Either way, the one or more particular content items may be have been identified as part of a content item selection event conducted by a content provider (e.g., content provider 112), whether internal or external. If an external content provider, then publisher system 120 sends a request to the external content provider and waits for a response based on a content item selection event conducted by the external content provider.

Server-side bidding may be implemented using a serial approach or a parallel approach. In the serial approach, publisher system 120 sends a request to content provider 112 and, if there is no valid response from content provider 112 within a certain period of time (e.g., 50 milliseconds), then publisher system 120 sends a request to content provider 114, and so forth, until publisher system 120 receives (from a content provider) one or more content items to provide to the requesting client device.

In the parallel approach, publisher system 120 sends multiple requests simultaneously or near concurrently, each request directed to a different one of content providers 112-116. In some cases, publisher system 120 may receive a content item from multiple content providers 112-116. Publisher system 120 then selects one of the received content items (using one or more selection criteria) and transmits that content item to the requesting client device. Selecting a content item from among multiple content items received from different content providers is referred to a publisher-side content item selection event, which is described in more detail below.

However, there are multiple issues that might arise (and should be addressed) when implementing server-side bidding, such as publisher-side selection events. Those issues are described in detail below.

ID Mapping

In client-side bidding, a client device may interact directly with an external content provider. In such a scenario, the client device provides, along with a content item request, an identifier that uniquely identifies a user operating the client device, uniquely identifies the client device, or is uniquely associated with a previous session that the client device had with the external content provider. An example of such an identifier is a browser-side cookie. The external content provider uses the identifier to identify a relevant content item to select during a content item selection event that the external content provider conducts.

In server-side bidding, publisher system 120 only has access to its domain cookies (e.g., linkedin.com if publisher system 120 is provided by LinkedIn). Publisher system 120 does not have access to the cookies or identifiers of other domains (e.g., AppNexus domain cookies). Therefore, when publisher system 120 sends a content request to an external content provider on behalf of a client device, the content request will not include the identifier that the external content provider normally expects. Without the proper identifier, the external content provider will have difficulty in properly targeting the user of the client device. Instead, the external content provider must conduct a content item selection event as if the user or client device are brand new and have never previously interacted with the external content provider.

In an embodiment, an ID mapping is generated between (1) an identifier known to publisher system 120 and (2) an identifier known to the external content provider. The respective identifiers may be device identifiers or user/member identifiers.

ID mappings may be hosted at publisher system 120 or at the external content provider. In the latter scenario, one or more web documents provided by publisher system 120 include a pixel or web beacon that, when processed by a client device (e.g., client device 132), causes the client device to call (or send a message) to publisher system 120. A web beacon is an object that is embedded in a web document (e.g., web page) or an email and may be implemented using JavaScript. The call or message sent by the client device may include certain data indicating the type of message or type of data requested, along with an identifier identifying a user operating the client device or the client device itself (referred to herein as a publisher-specific identifier). In response to publisher system 120 receiving the call or message, publisher system 120 determines the type of data requested and may encrypt the publisher-specific identifier. Publisher system 120 sends the (e.g., encrypted) publisher-specific identifier back to the client device, causing the client device to initiate (e.g., with a redirect message, such as a HTTP 302 message) a call to external content provider. In the call, the client device sends the (e.g., encrypted) publisher-specific identifier along with an identifier (or cookie) established by the external content provider and stored at the client device (referred to as a content provider-specific identifier). Because the client device is calling a domain of the external content provider, the client device also sends the content provider-specific identifier associated with that domain. In this way, the external content provider receives both the publisher-specific identifier and the content provider-specific identifier and creates a mapping that associates both identifiers.

Later, when the client device calls publisher system 120 and passes the publisher-specific identifier, publisher system 120 sends, to the external content provider, the publisher-specific identifier. The external content provider uses the publisher-specific identifier to look up the appropriate mapping and retrieve the corresponding content provider-specific identifier. The external content provider uses the content provider-specific identifier to identify (e.g., through a content item selection event) one or more content items to present on or through the client device. The external content provider sends the identified content item(s) to publisher system 120, which may forward the identified content item(s) to the client device or may first perform its own content item selection based on the identified content item(s) and one or more content items retrieved from one or more other content providers (whether internal or external).

In the scenario where ID mappings are maintained or hosted at publisher system 120, publisher system 120 may retrieve the ID mappings using one of two approaches. In a first approach, an external content provider provides the ID mappings that were generated in the manner described above where the external content provider builds and initially hosts the ID mappings. Later, the external content provider sends the ID mappings to publisher system 120. In a second approach, the external content provider provides a pixel or web beacon to publisher system 120 to insert in web content that publisher system 120 provides in response to requests from client devices. The web beacon includes a reference to the external content provider. When a client device processes web content that includes the web beacon, the client device, in response to processing the web beacon, calls the external content provider with a cookie. The external content provider receives, from the client device, a request that includes the cookie. Based on data within the request or based on the identified endpoint, the external content provider generates a redirect message that includes a content provider-specific identifier and sends the redirect message back to the client device. The redirect message causes the client device to send, to publisher system 120, a message, part of which includes the content provider-specific identifier and another part of which includes a publisher-specific identifier (or cookie) identifying the user or client device to publisher system 120. Publisher system 120 creates a mapping that associates both identifiers.

Later, when the client device calls publisher system 120 (for one or more content items) and passes the publisher-specific identifier, publisher system 120 uses the publisher-specific identifier to look up the appropriate mapping and retrieve the corresponding content provider-specific identifier. Such a "look-up" may entail calling an internal service that is responsible for retrieving a content provider-specific identifier in response to receiving a request that includes a publisher-specific identifier. Publisher system 120 then sends the content provider-specific identifier to the external content provider, which uses the content provider-specific identifier to identify (e.g., through a content item selection event) one or more content items to present on or through the client device. The external content provider sends the identified content item(s) to publisher system 120, which may forward the identified content item(s) to the client device or may first perform its own content item selection based on the identified content item(s) and one or more content items retrieved from one or more other content providers (whether internal or external).

In both hosted scenarios, the external content provider may use the content provider-specific identifier to retrieve segment information that indicates information about a user segment to which the corresponding user operating the client device belongs. A user segment may be defined by one or more attributes, such as an age range, a geographic region, an employment status, a job industry, or personal interests. The user segment may be used, during a content item selection event, to identify one or more content items to present through the client device.

External Content Provider with Multiple Endpoints

Figure 2:
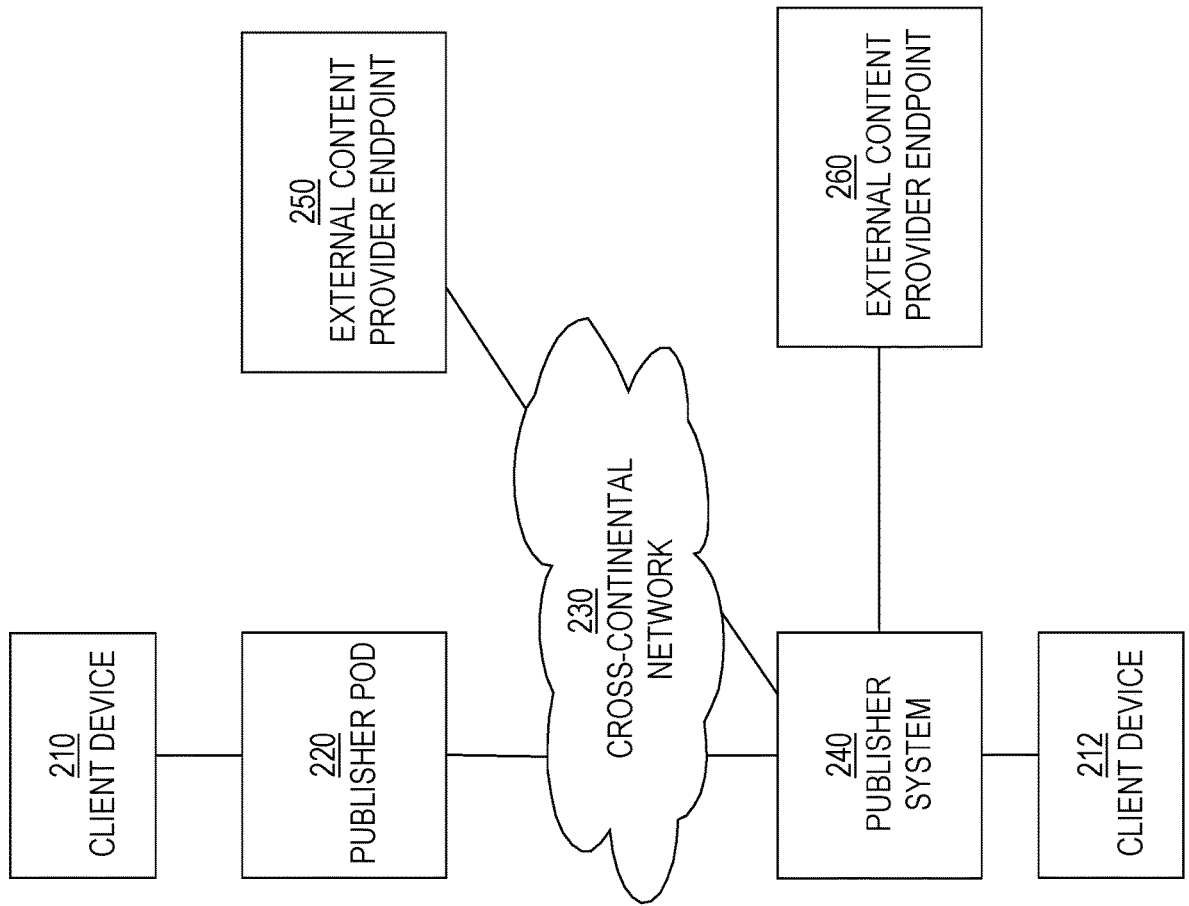
FIG. 2 is a block diagram that depicts an example of a cross-continental arrangement of computing devices.

FIG. 2 is a block diagram that depicts an example of a cross-continental arrangement of computing devices. Client device 210 is communicatively coupled to publisher pod 220, which is communicatively coupled to publisher system 240 via a cross-continental network 230. Publisher pod 220 is a computer system that allows client device 210 and other similarly geographically located client devices to connect to publisher system 240 to retrieve desired content. Publisher pod 220 is coupled with a cross-continental publisher system 240 because the publisher might have limited geo location availability due to a lack of a data center in the same geo locale as client device 210. While only one publisher pod 220 is depicted, publisher system 240 may be affiliated with multiple publisher pods. Also, while FIG. 2 depicts publisher system 240 as a single component, there may be multiple data centers that are geographically distributed and that provide the same content as publisher system 240.

Publisher system 240 is also communicatively coupled to an external content provider endpoint 250 via cross-continental network 230. Publisher system 240 is also communicatively coupled to client device 212 and an external content provider endpoint 260. Each external content provider endpoint has access to a different set of content items (not depicted) from one or more third party entities (e.g., advertisers). Even though publisher system 240 is an intermediary in server-side bidding, a client device still obtains a content item directly from an external content provider. This may be accomplished by publisher system 240 sending, to the client device, campaign/content item-specific ID data (e.g., in the form of a URL) and causing the client device to request that campaign/content item-specific data from the external content provider.

One problem with server-side bidding in such a global context is that an external content provider may have different endpoints, from which publisher system 240 must select. Typically, campaign creators desire to have their respective content items presented to users who reside in certain locales. For example, some content delivery campaigns target users in Europe while other content delivery campaigns target users in the United States. As another example, some regions (like Europe) have stricter user privacy policies and users' targeting/segment data of an external content provider is only available in certain regions. Thus, an external content provider may manage content delivery campaigns or content exchanges in geographic regions in which users who are targeted by the content delivery campaigns reside. If an endpoint of an external content provider resides in a geographic location that is very different than a geographic location from which a client device is located, then there may be no content delivery campaigns that target that client device.

In client-side bidding, this is not an issue because a client device will communicate directly with the nearest endpoint of the external content provider. For example, client device 210 would interact directly with external content provider endpoint 250. DNS will route the client request to the nearest endpoint of the domain requested.

In an embodiment, publisher system 240 determines which endpoint or server of an external content provider to send a content item request that includes a user-related identifier or a client device-related identifier (e.g., a publisher-specific identifier or a content provider-specific identifier). In response to receiving a content request from a client device, publisher system 240 may perform a lookup based on an IP address indicated in the content request. If the IP address indicates a location in a particular geographic region and that particular geographic region is associated with a particular endpoint or server of the external content provider, then publisher system 240 sends the content item request to that particular endpoint.

Latency Due to Multiple Geographic Traversals

Many publishers have a limited geographic footprint, such as hosting web servers and/or data centers only in the United States or other locales. Thus, for example, if client device 210 located in Germany sends a request to publisher system 240 located in the United States and the publisher implements server-side bidding, then, not only must the request from client device 210 to publisher system 240 traverse a large geographic area, publisher system 240 also interacts with an external content provider (which may be remote geographically relative to publisher system 240) and sends any data retrieved from the external content provider.

For example, a server-to-server call from publisher system 240 to external content provider endpoint 250 will be a cross continental call that might involves a single round trip of 100 milliseconds. In order to make that call, completing the call might involve three round trip handshakes making the time to complete the server-to-server at least 300 milliseconds, and the client side round trip call latency could go up to one second.

Therefore, due to the possibility of multiple cross-continental communications indicated by a single request from client device 210, the latency may be so high that any content item that publisher system 240 receives from the external content provider might not be presented in time. For example, a slot in which a content item would be displayed may not be visible anymore after a user of client device 210 scrolled down a web page or the user may have requested a different web page altogether.

In an embodiment, a persistent HTTP connection is created between publisher system 240 and an endpoint of an external content provider, such as external content provider endpoint 250. If publisher system 240 has multiple data centers, then one or more of the data centers may create a different persistent HTTP connection with that endpoint. A persistent HTTP connection is a single TCP connection through which multiple HTTP requests and responses may be sent, as opposed to opening a new connection for every request-response pair. In this way, multiple roundtrips (which would be required to establish a TCP connection) between, for example, (1) a US data center of publisher system 240 and (2) a European endpoint of an external content provider (e.g., external content provider endpoint 250) are avoided for all (or many) requests after the first request between the two entities. Thus, a single persistent HTTP connection between publisher system 240 and external content provider endpoint 250 is used by publisher system 240 to process content requests from many different client devices.

Lack of IPV6 Support

The Internet Protocol (IP), the communications protocol that provides an identification and location system for computers on networks and routes traffic across the Internet. Internet Protocol version 6 (IPv6) is a recent version of IP and was developed by the Internet Engineering Task Force (IETF) to deal with the long-anticipated problem of IPv4 address exhaustion. IPv6 is intended to replace IPv4. However, some content providers still do not support IPv6.

Thus, in an embodiment, publisher system 120 converts an IPv6 address into an IPv4 address. However, because the size of IPv6 is much larger than IPv4 (i.e., 128 bits to 32 bits), simple conversion might not work well. If conversion of an IPv6 address to an IPv4 address is incorrect, then such an incorrect conversion might result in incorrect content targeting and, consequently, inappropriate or irrelevant content delivery campaigns bidding for a content slot. If a campaign creator implements an IP check to prevent its campaign(s) from competing in a content item selection event, then this might result in a rendering failure (or being blocked due to ad verification targeting match inaccuracy) and no content item might be shown in a content slot in the publisher's displayed content.

In an embodiment, to prevent a poor or incorrect IP conversion, a geographic location check is performed. Such a check involves identifying a geographic location to which an IPv6 address maps, identifying a geographic location to which a converted IPv4 address maps, and comparing the two geographic locations. If the two geographic locations match, then the converted IPv4 address is sent in a server-to-server (S2S) call from publisher system 120 to an external content provider (e.g., content provider 112) for content. If the two geographic locations do not match, then the geographic location of the IPv6 address is sent in the S2S call. Doing so, may significantly reduce the number of blank content slots seen by users of client devices 132-136.

A "geographic location" may refer to a country, a state, another political region or entity, a city, or a zipcode. Two geographic locations may still be considered a "match" if both indicate the same country and/or state, even though the city and/or zip code may be different. Therefore, a partial (non-exact) match may be sufficient for sending the converted IPv4 address in a S2S call to an external content provider.

Logged Out Users

In server-side bidding, a client device sends a request for content to publisher system 120 instead of to a content provider, such as content provider 112. Because the first call is to publisher system 120 (or a server thereof), an ID mapping to map publisher-specific identifiers to content provider-specific identifiers is created so that an external content provider may process a request (from publisher system 120) that is initiated by the client device. However, if a user of the client device is logged out of publisher system 120, then publisher system 120 may not be able to receive a publisher-specific identifier from the client device. Therefore, the ID mapping will be useless and the external content provider will not be able to effectively target content to the client device.

In an embodiment, publisher system 120 "forces" a client device being operated by a logged out member to retrieve the client device's content provider-specific identifier from the external content provider and transmit that identifier to publisher system 120. Thus, publisher system 120, when interacting with the external content provider, can send the content provider-specific identifier to the external content provider. While this embodiment may be implemented for logged in members, this embodiment may suffer from longer latency than an ID mapping approach described herein.

Figure 3:
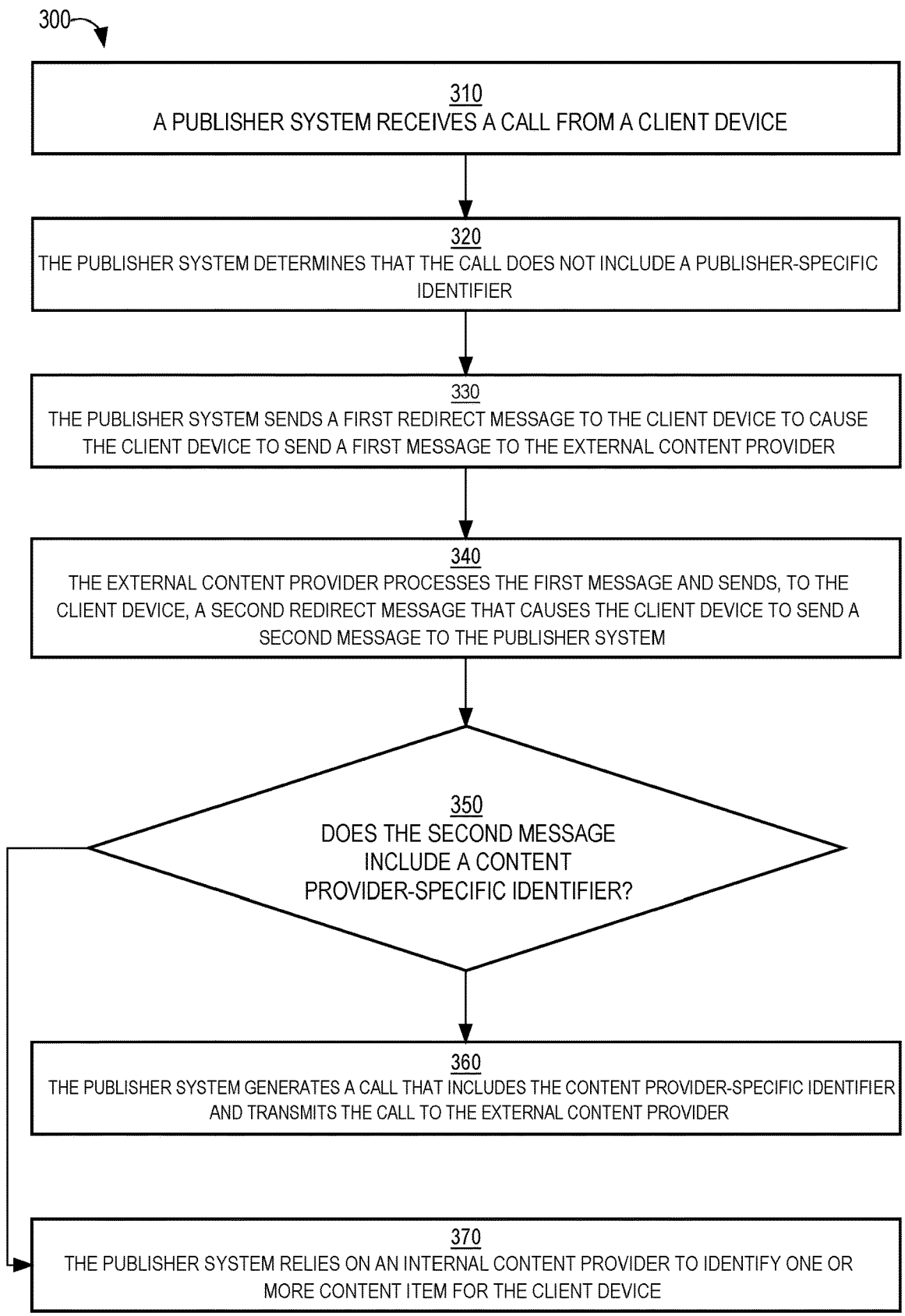
FIG. 3 is a flow diagram that depicts a process for supporting logged out users, in an embodiment.

FIG. 3 is a flow diagram that depicts a process 300 for supporting logged out users, in an embodiment. Some blocks of process 300 may be performed by publisher system 120, others blocks by an external content provider, and other blocks by a client device (e.g., client device 132).

At block 310, publisher system 120 receives a call from a client device. The call is for a specific type of content (e.g., one or more ads). The endpoint or destination of the call may be associated with the specific type.

At block 320, publisher system 120 determines whether the call includes a publisher-specific identifier (or a cookie) that identifies (to publisher system 120) a user of the client device or the client device itself. If not, then process 300 proceeds to block 330.

At block 330, publisher system 120 sends, to the client device, a redirect message that causes the client device to send, to the external content provider, a message (which may be considered a different message than the redirect message) that includes a cookie that is associated with the external content provider and that the external content provider internally associates with a content provider-specific identifier for the client device. Based on the redirect message, the client device will call the external content provider to retrieve a content provider-specific identifier. The message sent to the external content provider may be a specific type of message or a message with certain data that indicates, to the external content provider, what the client device expects of the external content provider.

At block 340, the external content provider receives the message requesting the content provider-specific identifier and sends, to the client device, a redirect message with the client device's content provider-specific identifier, if one exists. If one exists, then the redirect message causes the client device to send the content provider-specific identifier to publisher system 120. A content provider-specific identifier might not exist if the client device has not yet before interacted with the external content provider. Based on the redirect message from the external content provider, the client device sends a message (that might include a content provider-specific identifier) to publisher system 120.

At block 350, publisher system 120 determines whether the message includes a content provider-specific identifier. If so, process 300 proceeds to block 360. Otherwise, process 300 proceeds to block 370.

At block 360, publisher system 120 generates an S2S call (e.g., an HTTP request) that includes the content provider-specific identifier and transmits the S2S call to the external content provider. The external content provider uses the content provider-specific identifier to identify one or more relevant content items and sends the one or more content items to publisher system 120, which may forward the one or more content items to the client device for presentation (e.g., display).

At block 370, publisher system 120 relies on an internal content provider (e.g., content provider 114) to identify one or more content items for the client device or process 300 returns to block 330, where publisher system 120 causes the client device to interact with a different external content provider, if one exists. In some cases, block 370 might still proceed to transmit the S2S call to the external content provider with basic client device information including browser type, IP address, etc., without the content provider specific identifier. In such cases, the chance to obtain a content item from the external content provider might be lower.

In the case where a publisher hosts a mapping and does not have a mapping for a particular user, the above approach may be used to give one final chance to get a mapping and monetize the impression. For example, a first option is to perform a ID lookup in a publisher mapping table; a second option is to force the client to call the external content provider in order to get an ID; and third option is to fail out, by relying on a set of content items that are not necessarily targeted to any particular user.

Server-Side Bid Decision System

Publishers sell their inventory (comprising of space on their respective web pages) to content providers (e.g., ad exchanges) with the aim of maximizing revenues the publishers receive for the publishers' inventory through real-time content item selection events ("auctions"). However, other than revenues, a publisher might have one or more other optimizing goals, such as user friendliness, campaign reach, traffic diversion, etc. Embodiments described herein comprise a system and method of content item selection events in a server-side bid decision system that can intelligently and adaptively meet a publisher's customized needs in terms of deciding how to sell the publisher's inventory for the best content items.

By letting multiple demand sources (e.g., content providers) bid on the same space at the same time, a publisher can increase its revenue. As described previously, a content item selection event is the process that facilitates the allocation of space between publishers and third party entities (e.g., advertisers). Traditionally, content providers (such as ad exchanges) play a much larger role in auctions. However, despite the sophistication and domination of ad exchange auctions, server-side bidding, along with its content item selection event, possesses a few advantages. First, server-side bidding gives a publisher the flexibility to define its needs and to adjust its requirements at the inventory level. Second, server-side bidding can take into account the needs and interests of the seller (or publisher) better and can help a seller maximize its revenue, reach, user-friendliness, or other factors on which the seller may be focused. Third, due to the fact that server-side bidding represents a publisher better and the ease in collecting a publisher's user data (since all client calls go through the publisher's system), server-side bidding allows user behaviors to be analyzed more accurately and can, thus, target users more appropriately. Fourth, publishers may have their own ad demand and formats and need a way to bring various ad demand (internal vs external) together to optimize.

Figure 4:
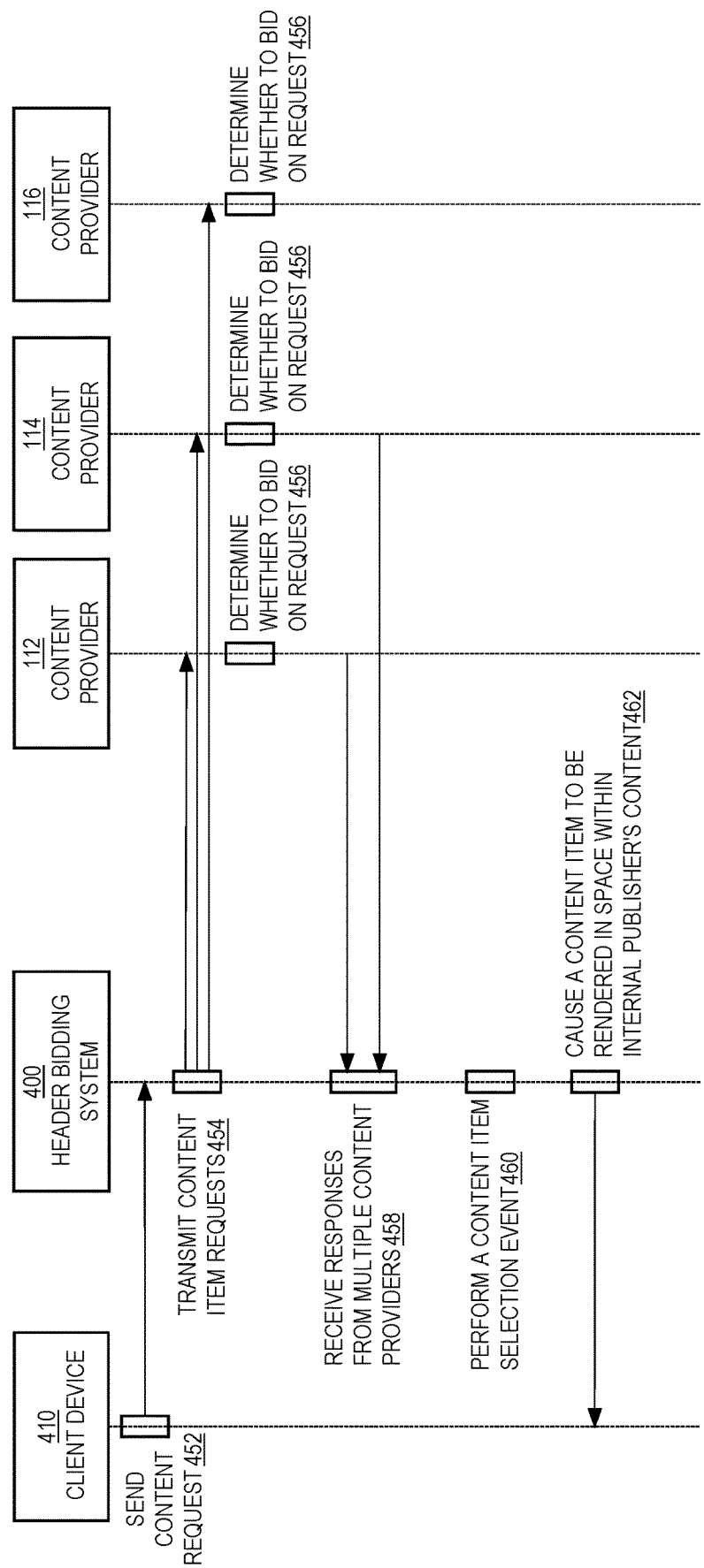
FIG. 4 is a block and sequence diagram that depicts a process implemented by a system that conducts content item selection events, in an embodiment.

FIG. 4 is a block and sequence diagram that depicts a process implemented by a server-side bid decision system 400, in an embodiment. Server-side bid decision system 400 may be part of publisher system 120 or may be implemented separate from publisher system 120, in which case publisher system 120 may provide data to server-side bid decision system 400, such as user interaction data.

At block 452, server-side bid decision system 400 receives a content item request (e.g., in the form of an HTTPS request) from a client device executing code retrieved from an internal publisher (of which there may be multiple). Example internal publishers include LinkedIn.com, SlideShare, Skype, and MSN.

At block 454, in response, server-side bid decision system 400 transmits a content item request to multiple (internal and/or external) content providers (e.g., content providers 112-116).

At block 456, the content providers decide whether to bid on behalf of third party entities.

At block 458, server-side bid decision system 400 receives bid responses from multiple content providers (e.g., both internal and external), which may be less than the number of content providers that received the content item request from server-side bid decision system 400. Each bid response includes (or refers to) a content item and, optionally, a bid price.

At block 460, server-side bid decision system 400 performs a content item selection event to select, based on one or more criteria, the "best" content item(s).

At block 462, a selected content item is rendered in space (e.g., an ad slot) within the internal publisher's content.

Not shown in FIG. 4 are the user interaction data (e.g., impressions, clicks, conversions) and other metrics (e.g., contextual page elements and aggregate user/page behavior) of the rendered content items that server-side bid decision system 400 and content providers track for purposes of billing and model enhancement. The tracking of such data may involve user browsers firing pixels (or web beacons) so that server-side bid decision system 400 and content providers can conduct tracking logic.

At block 460, the content item selection event may involve selecting a content item that maximizes the publisher's revenue. However, embodiments described herein might not only seek to maximize revenue, but also give a publisher flexibility to specify other customized optimizing goals for the publisher's inventory. Server-side bid decision system 400 can continuously and automatically perform the optimizations to achieve those goals, such as user engagement, campaign reach, user/member experience, etc. Such goals, in the long run, can all indirectly convert to higher potential revenue for a publisher. As an example, in LinkedIn properties, demand from external content providers can be leveraged due to higher bid prices. However, demand from internal content providers might actually divert users to different web pages within LinkedIn properties, which leads to higher user engagement for the LinkedIn organization as a whole, and eventually results in more revenue. For example, a JobsYouMayBeInterestedIn (JYMBII) content item, when displayed on a target user's profile page and selected by a viewer, diverts the viewer to a job page (which is also part of the LinkedIn web domain), where similar jobs for the target user's current company will be displayed.

Thus, conducting a content item selection event using criteria that only maximizes immediate revenue might lead to suboptimal solutions over the long run in terms of revenue. Aiming at this problem, embodiments described herein include a model-based server-side bid decision system that takes into consideration longer term impact on the overall optimizing goals of multidimensional factors. The server-side bid decision system may track user engagement, impressions, clicks, conversions, and details of each content item (e.g., format of a content item, type of the content item (e.g., dynamic, text, or display), revenue, and bid price) and then combines these feedbacks to train models so as to maximize publisher revenue over a long-term period.

In an embodiment, server-side bid decision system 400 applies one or more filter criteria to the content items received from the content providers in block 458. One example filter criterion is whether a content item is from a third party entity (e.g., an advertiser) that is in a black list. If so, then the content item is not considered in the content item selection event conducted in block 460. Other example filter criteria may be implemented by adjusting (e.g., multiplying/discounting) bids based on historical performance or limiting content items based on user specific behavior.

In a related embodiment, server-side bid decision system 400 supports multiple publishers and different publishers are associated with different filter criteria.

Model-Based Server-Side Bid Decision System

A content item selection event model (or "auction model" for purposes of brevity) takes into account multiple factors when calculating an adjusted auction price for a particular content item. Example factors include a request reduction amount (or bid price), performance data (such as CTR), internal traffic diversion, user engagement, and a cost factor (such as amount that an external content provider might charge a publisher for the publisher selecting a content item from the external content provider). If the content provider of a particular content item is an internal content provider, then the cost factor may be zero. An example formula is as follows:

$$AAP(\text{bid, context, campaignType, bidderType}) = \alpha * \text{bid} + \beta * CTR(\text{context, campaignType}) + \gamma * E(\text{user engagement, traffic diversion}) - \text{bidderCost}(\text{bidderType})$$

where:

(1) "bid" is a request reduction amount that a bidder (or content provider) pays the server-side bid decision system for a content item;

(2) "CTR" refers to a function that takes multiple inputs and computes a user selection rate or "click-through rate", such as a predicted user selection rate. The function may be based on machine-learned coefficients of past user selections (and non-selections), each coefficient corresponding to a variable that corresponds to an attribute or characteristic (or "feature" in machine learning parlance) of a user interaction event (e.g., an impression, a click, or a conversion). Examples of attributes of a user interaction event include attributes of a user/viewer of a content item, attributes of the content item itself, attributes of the context of the event (e.g., time of day, day of week), and attributes of the context of the page (or content) in which the content item was presented. According to the example formula, the higher the output of the function, the higher the adjusted auction price.

(3) "context" refers to a page context, including one or more contextual information items of a page that the viewer is visiting, such as a page identifier (that uniquely identifies this page or page type from other pages or page types), slot size, contextual organization (that indicates an organization (if any), such as a company, indicated on the visited page), and contextual geography (that indicates a certain country, state, city, and/or geographic region of an entity indicated on the visited page, where example entities include a person, a group of people, a company, or other organization. Thus, CTR may be computed based on multiple contextual information items.

(4) "campaignType" refers to a product type to which a campaign belongs, such as a sponsored content campaign, dynamic campaign, a text campaign, and a display campaign, which originates from an external content provider.

(5) "E" refers to user engagement and traffic diversion factor. As an example of user engagement, a viewer that stays within a local web domain (e.g., a viewer viewing a LinkedIn user profile page clicking a link to a LinkedIn company page) will have an opportunity for more impressions. Thus, some content items (that, when selected, redirect a viewer to another web page of the same website or an affiliated web site) should have a higher user engagement factor that other content items that, when selected, redirect a viewer to an unaffiliated website. As an example of a traffic diversion factor, some web pages within a web domain tend to have greater importance than other web pages within that same web domain. The greater importance may be due to greater opportunities for additional revenue or to other non-monetary reasons. According to the example formula, the higher the user engagement and traffic diversion factor, the higher the adjusted auction price.

(6) "bidderType" refers to a type of bidder or to a specific content provider, such as a particular external content provider.

(7) "bidderCost" is function that takes bidderType as input and returns a cost. For example, an advertiser pays an external content provider a bid price and the external content provider charges a publisher a margin out of the bid price and pays the rest to the publisher. As a specific example, an advertiser pays $2 for 1,000 impressions on LinkedIn.com, an external content provider charges 20 cents and pays the remaining $1.80 to LinkedIn. Thus, in this example, the 20 cents is the bidder cost. According to the example formula, the higher the bidder cost, the lower the adjusted auction price. The cost may change over time, for example, to increase the chances (and, thus, the frequency) that certain content providers win content item selection events.

(8) $\alpha$, $\beta$, and $\gamma$ are coefficients that may be manually specified or machine learned. A value of 0 would effectively eliminate the effect that the corresponding variable has on the adjusted auction price.

Near Real-Time Modeling

In an embodiment, the auction model is based on an offline modeling component and a near real-time modeling component. For example, the offline modeling component generates a portion of the auction model every day (and may be based on the last week or ten days' worth of user interaction data). Thus, the offline portion may be a day old due to lag in generating the auction model. The near real-time modeling component, on the other hand, generates another portion of the auction model based on user interaction data from a more recent, and shorter, period of time (relative to the user interaction data upon which the offline portion of the auction model is generated), such as the last 1 hours' worth of user interaction data. Thus, the offline portion and the near real-time portion are based on different user interaction data.

In a related embodiment, the offline and near real-time modeling components generate separate CTR models that are used to calculate a different CTR or user selection rate for the same content item. The two CTR models may be generated using different machine learning techniques, such as supervised learning for offline modeling and reinforcement learning for near real-time modeling. Also, the two CTR models may take the same inputs or different sets of inputs. For example, the offline CTR model may take multiple attribute values of the viewer as input, while the near real-time model may only take one or more contextual features and campaign type as input.

User Engagement

In an embodiment, E is modeled as the following:

$$E=\xi+\eta+CPM+p*CPM+p*p*CPM+p*p*p*CPM+\ldots$$

Based on geometric progression, the result is:

$$E=\xi+\eta+CPM*(1/(1-p))$$

where:
(1) ξ is an expected long term impression, which models a user's likeliness to returning to the same web site or web domain in the near future. ξ may be associated with the content, product type, and content provider. ξ may be higher for internal bidders/content providers compared to external bidders/content providers. For internal bidders, the value of ξ for dynamic content items may be set to have a higher value than the value of ξ for text content items. ξ may also vary among the different content items, such as different dynamic content items.
(2) η is an internal traffic diversion factor. If the landing page of a content item is a certain type of web content or web page (e.g., company profile pages or job pages), then η for the content item may have a higher value than a content item whose landing page is not the certain type of web content. Thus, the value of η may be different for different content items. A value of 0 may indicate that the corresponding content item, when selected, does not redirect the viewer to a certain type of web content.
(3) CPM is a cost per impression of the content item for which user engagement is being determined. Each content delivery campaign may have a different CPM. Different content items within the same content delivery campaign may be associated with a different CPM.
(4) p is the probability of showing a dynamic content item (or a content item that, when selected, redirects the viewer to another web page in the same web domain or an affiliated website). Dynamic content items may come from an internal content provider. Non-dynamic content items may come from both internal and external content providers. A characteristic of a dynamic content item is that the content of the dynamic content item is customized for the viewer and may take into account attributes of the viewer and/or attributes of the content that the viewer requested, such as a specific user's profile page or a specific company profile page. The value of p can be observed from impression tracking and may be represented as:

$p$(further impression of dynamic content items|user selection of the content item)

User interaction data may indicate when a particular user or client device selected a content item and then whether (and, if so, when) additional dynamic content items or "internal" content items (i.e., content items from an internal content provider) were presented to the particular user or on the client device. Such user interaction data may be used to calculate p.

In an embodiment, different content items have a different p value. For example, one type of content item may be associated with a higher p value than other types of content items. As another example, content items from one content provider (such as an internal content provider) may be associated with a higher p value than content items from another content provider (such as an external content provider).

Additionally, some content items, even non-dynamic content items (or content items that, when selected, cause a viewer to be redirected to another web domain or to an unaffiliated web site), may be associated with users eventually returning to the publisher's web site (or an affiliated web site) after a period of time (e.g., within an hour of selection of a content item).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
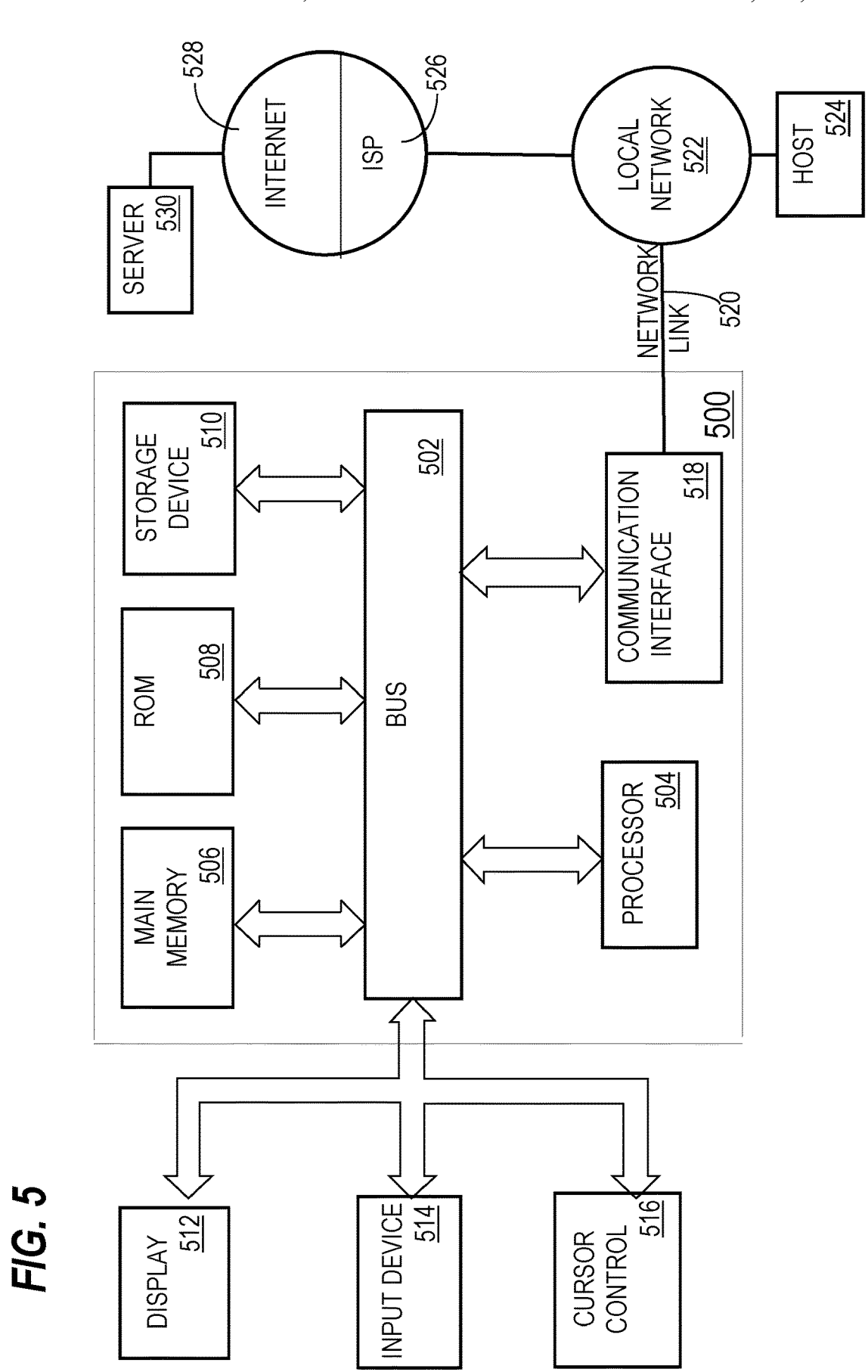
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A system comprising:
one or more processors;
one or more storage media storing instructions which, when executed by the one or more processors, cause:
  receiving, from a client device that is remote relative to the system, a request for one or more content items;
  in response to receiving the request:
    generating a plurality of content requests, wherein none of the plurality of content requests identifies any content items to retrieve;
    sending each content request of the plurality of content requests to a different content provider of a plurality of content providers, wherein at least one of the content requests in the plurality of content requests is transmitted over a network to a content provider that is remote relative to the system and to the client device;
    receiving a plurality of responses, each of which is received from a different content provider of the plurality of content providers;
    wherein each response of the plurality of responses identifies a different content item of a plurality of content items;
    making a determination that at least one content item of the plurality of content items is associated with a particular web domain;

selecting, based on the determination, a particular content item of the plurality of content items;

causing data associated with the particular content item to be transmitted to the client device.

2. The system of claim 1, wherein the request is a content item request, wherein the instructions, when executed by the one or more processors, further cause:

prior to receiving the content item request, receiving, from the client device, a particular request for content;

in response to receiving the particular request, sending particular content to the client device, wherein the particular content includes executable code that, when executed by the client device, causes the client device to send the content item request to the system.

3. The system of claim 1, wherein making the determination comprises making the determination for a first content item of the plurality of content items, wherein the instructions, when executed by the one or more processors, further cause:

in response to making the determination, determining a first value and associating the first value with the first content item;

making a second determination that a second content item of the plurality of content items is associated with a second web domain that is different than the particular web domain;

in response to making the second determination, determining a second value that is different than the first value and associating the second value with the second content item;

wherein selecting the particular content item is also based on the first value and the second value.

4. The system of claim 1, wherein the instructions, when executed by the one or more processors, further cause:

identifying a per impression cost for a certain content item of the plurality of content items;

generating a combined value by combining the per impression cost with a value that is based on a probability of an impression given a user selection of the certain content item;

generating a plurality of adjusted values, each of which for a different content item of the plurality of content items;

wherein a particular adjusted value, of the plurality of adjusted values, for the certain content item is based on the combined value;

wherein selecting the particular content item is also based on the plurality of adjusted values.

5. The system of claim 1, wherein the instructions, when executed by the one or more processors, further cause:

determining, for a certain content item of the plurality of content items, a user selection rate based on a page context and the certain content item;

wherein selecting the particular content item is also based on the user selection rate.

6. The system of claim 1, wherein the instructions, when executed by the one or more processors, further cause:

determining a first cost that is associated with a first content provider of the plurality of content providers;

determining a second cost that is associated with a second content provider of the plurality of content providers, wherein the first cost is different than the second cost;

wherein selecting the particular content item is also based on the first cost and the second cost.

7. The system of claim 1, wherein the instructions, when executed by the one or more processors, further cause:

sending a publisher-specific identifier, that uniquely identifies a first client device, to the first client device;

causing the first client device to send, to a particular content provider of the plurality of content providers, a message that includes the publisher-specific identifier;

wherein the particular content provider associates the publisher-specific identifier with a content provider-specific identifier that the particular content provider associates with the first client device;

after causing the first client device to send the message, receiving a second request from the first client device;

in response to receiving the second request:

generating a particular content request and including the publisher-specific identifier in the particular content request;

sending the particular content request to the particular content provider.

8. The system of claim 1, wherein the instructions, when executed by the one or more processors, further cause:

receiving particular data from a particular content provider of the plurality of content providers;

wherein the particular data is inserted into particular web content;

after the particular data is inserted into the particular web content, receiving, from a first client device, a first request for the particular web content;

in response to receiving the first request, sending the particular web content to the first client device;

after sending the particular web content to the first client device:

receiving, from the first client device, a content provider-specific identifier that the particular content provider associates with the first client device;

creating an association between (1) the content provider-specific identifier and (2) a publisher-specific identifier that a publisher associates with the first client device;

after creating the association, receiving a second request from the first client device;

in response to receiving the second request:

identifying the publisher-specific identifier that is associated with the first client device;

using the publisher-specific identifier to identify the association;

based on the association, identifying the content provider-specific identifier;

generating a particular content request and including the content provider-specific identifier in the particular content request;

sending the particular content request to the particular content provider.

9. The system of claim 1, wherein the instructions, when executed by the one or more processors, further cause:

in response to receiving the request:

identifying an address associated with the client device;

for a particular content provider of the plurality of content providers, selecting, based on the address, a particular server of a plurality of servers of the particular content provider to which to send a content request of the plurality of content requests;

wherein sending each content request comprises sending, to the particular server of the particular content provider, a particular content request that includes a client device identifier that is associated with the client device.

10. The system of claim 9, wherein the instructions, when executed by the one or more processors, further cause:

establishing a persistent connection between the system and the particular server;
after establishing the persistent connection:
receiving a plurality of requests from a plurality of client devices;
for each request of the plurality of requests, sending, through the persistent connection, a different content request to the particular server.

11. The system of claim 1, wherein the instructions, when executed by the one or more processors, further cause:
in response to receiving the request:
identifying an IP address of the client device;
determining a converted version of the IP address;
identifying a first geographic location of the IP address;
identifying a second geographic location of the converted version of the IP address;
determining whether the first geographic location matches the second geographic location;
in response to determining that the first geographic location does not match the second geographic location, including, in a particular content request of the plurality of content requests, the first geographic location.

12. The system of claim 1, wherein sending comprise sending the plurality of content requests concurrently to the plurality of content providers.

13. A system comprising:
one or more processors;
one or more storage media storing instructions which, when executed by the one or more processors, cause:
receiving, from a client device that is remote relative to the system, a request for one or more content items;
in response to receiving the request:
generating a plurality of content requests;
sending each content request of the plurality of content requests to a different content provider of a plurality of content providers, wherein at least one of the content requests in the plurality of content requests is transmitted over a network to a content provider that is remote relative to the system and to the client device;
receiving a plurality of responses, each of which is received from a different content provider of the plurality of content providers;
wherein each response of the plurality of responses identifies a different content item of a plurality of content items;
making a determination that at least one content item of the plurality of content items is associated with a particular web domain;
selecting, based on the determination, a particular content item of the plurality of content items;
causing data associated with the particular content item to be transmitted to the client device;
determining that the client device is logged out of the system;
in response to determining that the client device is logged out of the system, sending, to the client device, a first message that, when executed by the client device, causes the client device to send, to a particular content provider, a second message;
after sending the first message to the client device and after the client device sends the second message to the particular content provider, receiving, from the client device, a content provider-specific identifier that the particular content provider associates with the client device.

14. A method comprising:
receiving, over a network from a client device, a request for one or more content items;
in response to receiving the request:
generating a plurality of content requests, wherein none of the plurality of content requests identifies any content items to retrieve;
sending each content request of the plurality of content requests to a different content provider of a plurality of content providers, wherein at least one of the content requests in the plurality of content requests is transmitted over a second network to a content provider that is remote relative to (1) a system that receives the request and (2) the client device;
receiving a plurality of responses, each of which is received from a different content provider of the plurality of content providers;
wherein each response of the plurality of responses identifies a different content item of a plurality of content items;
making a determination that at least one content item of the plurality of content items is associated with a particular web domain;
selecting, based on the determination, a particular content item of the plurality of content items;
causing data associated with the particular content item to be transmitted to the client device;
wherein the method is performed by one or more computing devices.

15. The method of claim 14, wherein making the determination comprises making the determination for a first content item of the plurality of content items, the method further comprising:
in response to making the determination, determining a first value and associating the first value with the first content item;
making a second determination that a second content item of the plurality of content items is associated with a second web domain that is different than the particular web domain;
in response to making the second determination, determining a second value that is different than the first value and associating the second value with the second content item;
wherein selecting the particular content item is also based on the first value and the second value.

16. The method of claim 14, further comprising:
identifying a per impression cost for a certain content item of the plurality of content items;
generating a combined value by combining the per impression cost with a value that is based on a probability of an impression given a user selection of the certain content item;
generating a plurality of adjusted values, each of which for a different content item of the plurality of content items;
wherein a particular adjusted value, of the plurality of adjusted values, for the certain content item is based on the combined value;
wherein selecting the particular content item is also based on the plurality of adjusted values.

17. The method of claim 14, further comprising:
determining, for a certain content item of the plurality of content items, a user selection rate based on a page context and the certain content item;
wherein selecting the particular content item is also based on the user selection rate.

18. The method of claim 14, further comprising:
determining a first cost that is associated with a first content provider of the plurality of content providers;
determining a second cost that is associated with a second content provider of the plurality of content providers, wherein the first cost is different than the second cost;
wherein selecting the particular content item is also based on the first cost and the second cost.

19. The method of claim 14, further comprising:
sending a publisher-specific identifier, that uniquely identifies a first client device, to the first client device;
causing the first client device to send, to a particular content provider of the plurality of content providers, a message that includes the publisher-specific identifier;
wherein the particular content provider associates the publisher-specific identifier with a content provider-specific identifier that the particular content provider associates with the first client device;
after causing the first client device to send the message, receiving a second request from the first client device;
in response to receiving the second request:
generating a particular content request and including the publisher-specific identifier in the particular content request;
sending the particular content request to the particular content provider.

20. The method of claim 14, further comprising:
receiving particular data from a particular content provider of the plurality of content providers;
wherein the particular data is inserted into particular web content;
after the particular data is inserted into the particular web content, receiving, from a first client device, a first request for the particular web content;
in response to receiving the first request, sending the particular web content to the first client device;
after sending the particular web content to the first client device:
receiving, from the first client device, a content provider-specific identifier that the particular content provider associates with the first client device;
creating an association between (1) the content provider-specific identifier and (2) a publisher-specific identifier that a publisher associates with the first client device;
after creating the association, receiving a second request from the first client device;
in response to receiving the second request:
identifying the publisher-specific identifier that is associated with the first client device;
using the publisher-specific identifier to identify the association;
based on the association, identifying the content provider-specific identifier;
generating a particular content request and including the content provider-specific identifier in the particular content request;
sending the particular content request to the particular content provider;
wherein the method is performed by one or more computing devices.

* * * * *